Sept. 6, 1949.  C. AMBRETTE  2,481,274
FEEDING APPARATUS FOR ALIMENTARY PASTE DIE
Filed April 17, 1946  4 Sheets-Sheet 1

INVENTOR.
Conrad Ambrette,
BY George D. Richards,
Attorney

Sept. 6, 1949.  C. AMBRETTE  2,481,274
FEEDING APPARATUS FOR ALIMENTARY PASTE DIE
Filed April 17, 1946  4 Sheets-Sheet 2

INVENTOR.
Conrad Ambrette,
BY George T. Richards,
Attorney

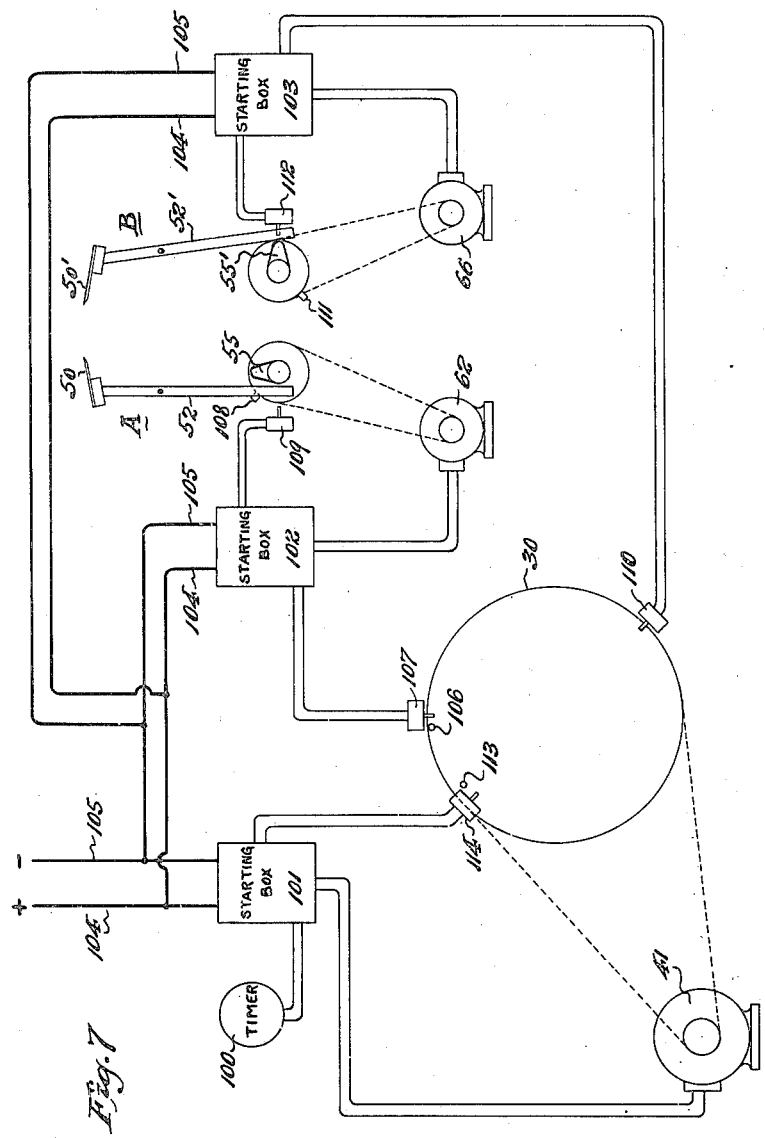

Patented Sept. 6, 1949

2,481,274

UNITED STATES PATENT OFFICE 2,481,274

FEEDING APPARATUS FOR ALIMENTARY PASTE DIE

Conrad Ambrette, Brooklyn, N. Y.

Application April 17, 1946, Serial No. 662,699

3 Claims. (Cl. 107—14)

This invention relates to apparatus for producing alimentary paste products, such as spaghetti, macaroni and like forms thereof; and the invention has reference, more particularly, to novel apparatus for delivering alimentary paste to and extruding it through a forming die means, racking the extruded paste strings, and then delivering the racked strings to drier apparatus, all in an automatic continuous manner.

The invention has for an object to provide novel apparatus for extruding alimentary paste through an elongated die means so as to issue the same from the latter in linear rows of spaced strings adapted to be cut away from the die means to provide desired string lengths thereof, and then to automatically apply the strings to racking rods, and thereupon automatically convey the racked strings to and through drier apparatus.

The apparatus has for another object to provide alimentary paste production apparatus, of the kind above mentioned, including novel means for delivering and uniformly distributing alimentary paste to and throughout the length of an elongated die means; in such manner as to assure uniform expressing pressure of the paste over the entire area of the apertured die plate of said die means, so that the extruded paste strings will be of uniform length throughout the linear rows thereof as extruded from the die means.

The invention has for a further object to provide, in combination with an elongated die means, having its extrusion apertures arranged in two linear rows, an individual paste string severing or cut off mechanism for each row of extrusion die apertures; said severing or cut off mechanisms being subject to coordinated alternate operation, whereby the respective rows of issued paste strings may be alternately detached from the die means, racked and then conveyed to and through drier apparatus.

Still another object of the invention is to provide a continuous automatic alimentary paste production apparatus wherein paste string cutting, racking and conveying operations are coordinated in controlled timed relation.

Other objects of this invention, not at this time more particularly enumerated, will be understood from the following detailed description of the same.

Figure 1:
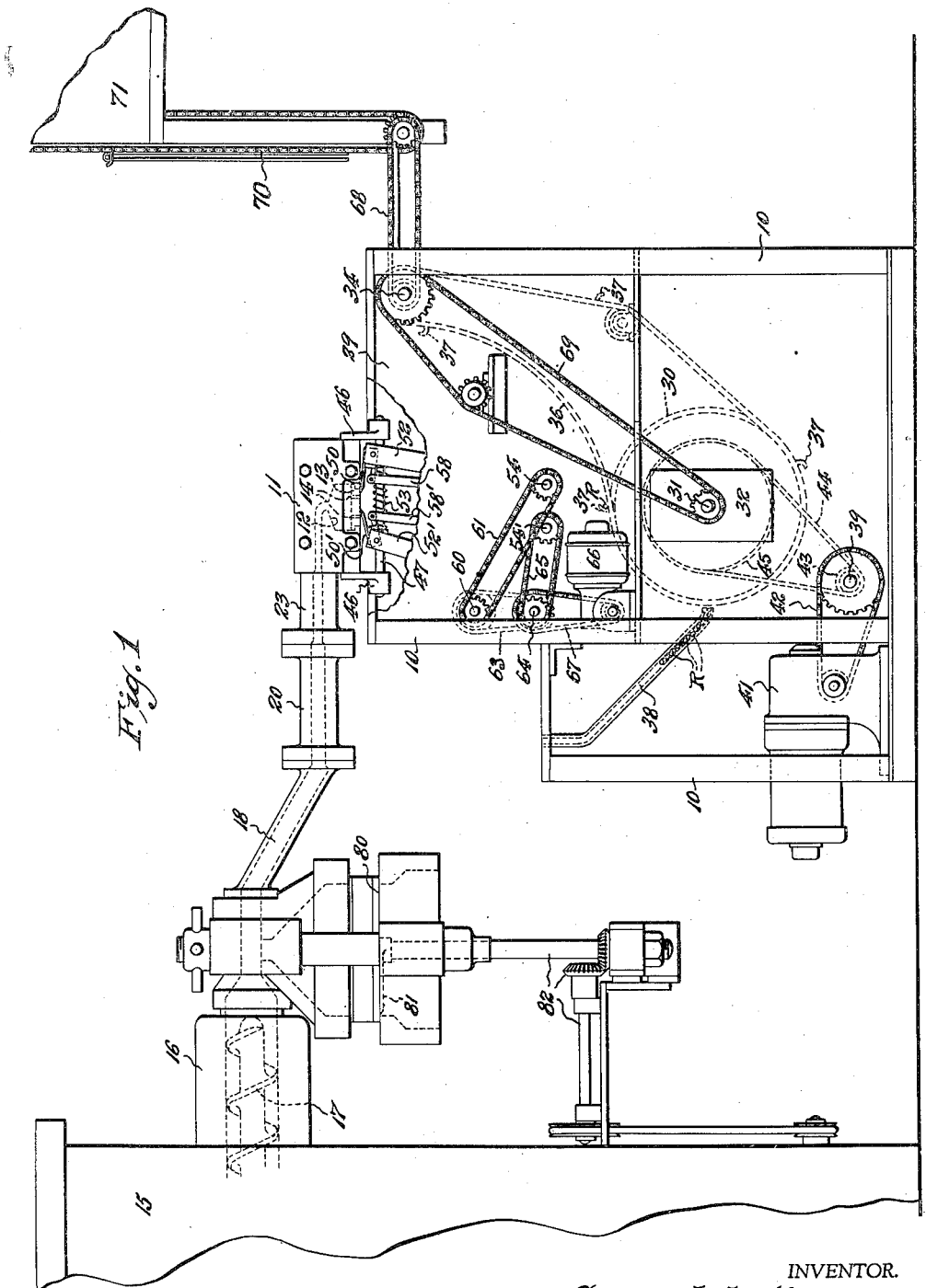
Figure 2:
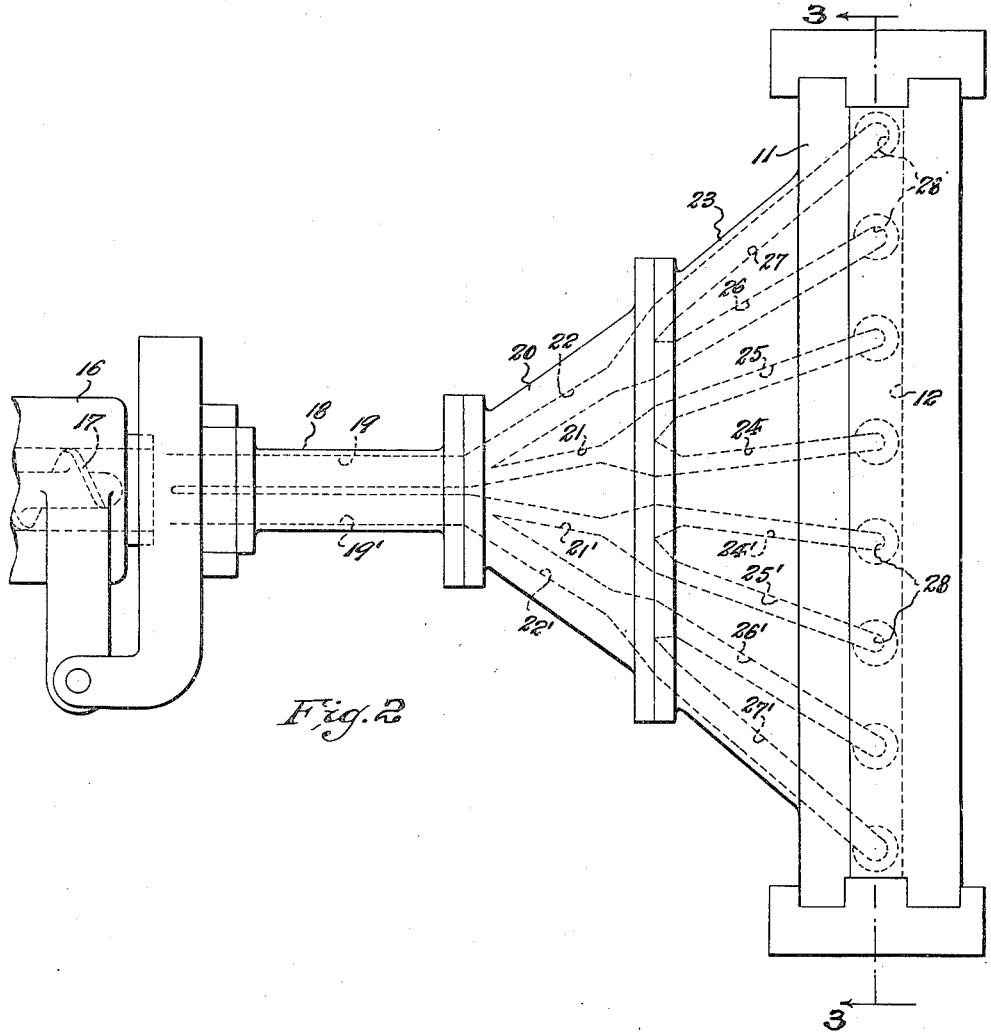
Figure 3:
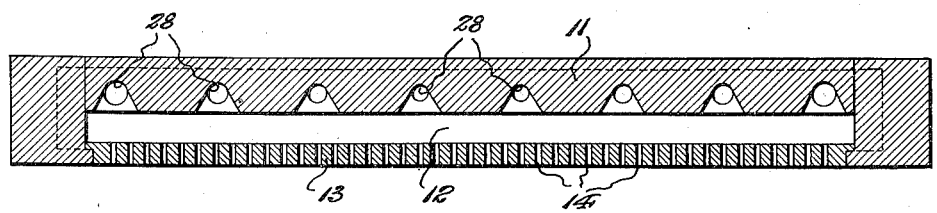
Figure 4:
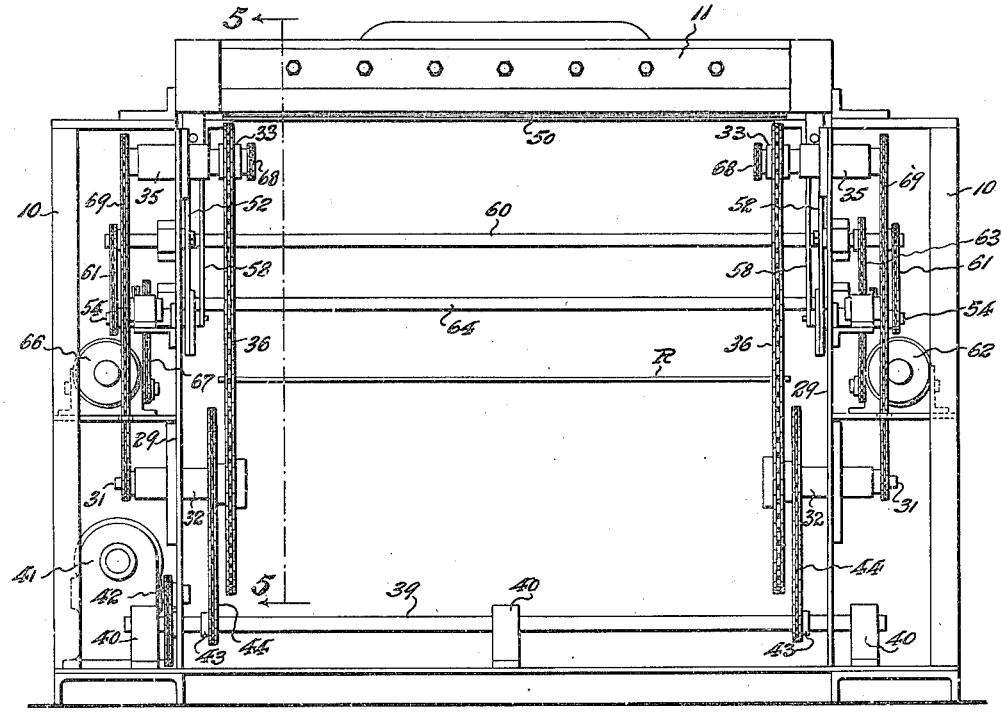
Figure 5:
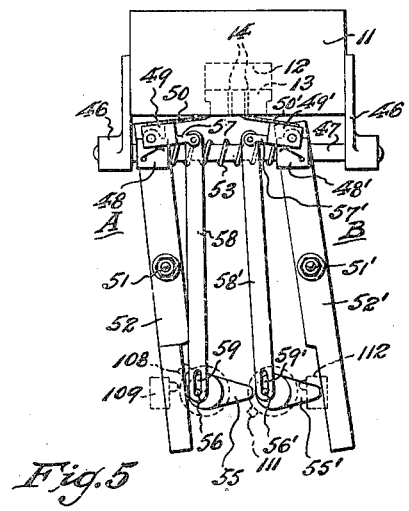
Figure 6:
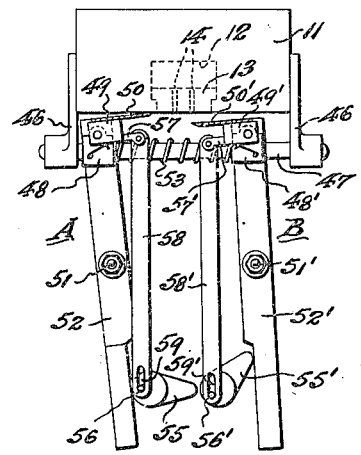

An illustrative embodiment of alimentary paste production apparatus according to this invention is shown in the accompanying drawings, in which:

Fig. 1 is a side elevational view of the apparatus according to this invention; Fig. 2 is a plan view of the means for delivering and distributing alimentary paste to the elongated die means of the apparatus, said view being drawn on an enlarged scale; and Fig. 3 is a longitudinal sectional view, taken on line 3—3 in Fig. 2; Fig. 4 is a front elevational view of the alimentary paste extrusion, cut off, racking and conveying mechanisms of the apparatus; Fig. 5 is a fragmentary transverse sectional view taken on line 5—5 in Fig. 4, and in part schematically shown, the same showing the cut off mechanisms which are cooperative with the elongated die means of the apparatus; and Fig. 6 is a fragmentary view, similar to that of Fig. 5, but showing another position of a cut off mechanism.

Fig. 7 is a schematic wiring diagram showing the means whereby the operations of the various mechanisms of the apparatus are coordinately timed and controlled.

Similar characters of reference are employed in the hereinabove described views, to indicate corresponding parts.

Referring to the drawings, reference character 10 indicates a framework by which is supported the die means, the paste string cut off means, and the paste string racking and conveyer means of the apparatus. Affixed to the framework, at the top thereof, is an elongated extrusion die means comprising a die housing 11 which is suitably constructed to provide a longitudinally disposed die chamber 12, in the bottom of which is supported a die plate 13. Said die plate 13 is provided with laterally spaced longitudinal rows of spaced die apertures 14, substantially corresponding in length to the length of said die chamber 12.

Means is provided for continuously delivering plastic alimentary paste into the die chamber 12 under a constant pressure calculated to force the same outwardly from the latter through the rows of die apertures 14, whereby to extrude from said apertures linear rows of spaced alimentary paste strings, ready to be cut away from the die means and thereupon racked, as will be subsequently more fully described. Said means comprises a suitable dough or paste mixing means 15 having a discharge head 16 in which is housed a rotatable feed screw 17. Said feed screw 17 is adapted to continuously discharge plastic dough or paste to and through means for distributing the same through multiple paths to the interior of the die chamber 12 along the entire length thereof, in such manner as to uniformly fill said die chamber, and to maintain therein expressing pressure upon the dough or paste uniformly throughout the length of the die chamber and over the entire area of the apertured die plate 13, so that strings of the dough or paste will be extruded from the die apertures 14 at uniform speed and of uniform mass and length at all points along the longitudinal rows of said apertures 14.

The novel means for distributively delivering the plastic dough or paste to the die chamber 12, and so as to exert uniform expressing pressure upon the chamber content, comprises a feeder section 18, and a succession of spreader sections connected together in end to end relation between the mixer discharge head 16 and the die housing 11 for communication with the die chamber 12 so as to simultaneously deliver the dough or paste into the latter along the entire length thereof. The number of spreader sections and the spreader passage branches thereof may be varied to suit the length of die means to be served. In an illustrative arrangement of the dough or paste delivering means as shown, said feeder section 18 is internally divided to provide two laterally parallel passages 19 and 19', whereby the stream of dough or paste issuing from the mixing means is separated into two moving streams of equal volume and pressure. Connected with the discharge end of the feeder section 18 is a first spreader section 20 which diverges in width from its point of coupled connection with said feeder section. Said first spreader section is provided with pairs of divergent dough or paste spreader passage branches leading from each feeder passage 19 and 19'. The pair of spreader passage branches leading from the feeder passage 19 comprises divergent branches 21 and 22 extending through the spreader section 20 at one side thereof, and, similarly, a pair of divergent branches 21' and 22' leading from the feeder passage 19' to extend through the opposite side of the spreader section 20. The outlet ends of said branches are substantially equi-spaced laterally along the discharge end of said spreader section 20. Since the innermost branches 21—21' extend more in the direct line of flow of dough or paste from the feeder passages 19—19', the same are of a somewhat smaller cross-sectional area than the cross-sectional areas of the outermost branches 22—22', thus providing comparatively greater restriction and consequent resistance to flow of dough or paste therethrough than is offered by the comparatively larger cross-sectional area of the latter. As a consequence of this, the flow of dough or paste is somewhat retarded in the branches 21—21', whereby to assure diversion of dough or paste for full flow through and over the somewhat greater length of the branches 22—22', and thereby to substantially equalize the flow pressure through all said branches. Connected with the discharge end of said first spreader section 20 is a second spreader section 23 which also diverges in width from its point of coupled connection with said first spreader section. Said second spreader section 23 is provided with pairs of divergent dough or paste spreader passage branches leading from each branch 21—22—21'—22' of the first spreader section 20. The pair of branches leading from the first spreader section branch 21 comprises divergent branches 24 and 25, which extend through the intermediate portion of the spreader section 23 at one side thereof, and, similarly, the pair of branches leading from the first spreader section branch 21' comprises like divergent branches 24' and 25', which extend through the intermediate portion of the spreader section 23 at the opposite side thereof. The pair of branches leading from the first spreader section branch 22 comprises divergent branches 26 and 27, which extend through one outer side portion of the spreader section 23, and, similarly, the pair of branches leading from the first spreader section branch 22' comprises like divergent branches 26' and 27', which extend through the opposite outer side portion of said spreader section 23. Said several branches of the second spreader section 23 are therefore disposed in fanned out relation, so that their outlet ends are substantially equi-spaced laterally along the discharge end of the same. As in the case of the first spreader section 20, the branches of the respective groups of branches 24—25—26—27 and 24'—25'—26'—27' are progressively increased in cross-sectional area from those of smallest cross-sectional area comprising the innermost branches 24—24' to those of greatest cross-sectional area comprising the outermost branches 27—27', so that restriction and resistance to flow of dough or paste therethrough is greatest with respect to said innermost branches and progressively diminishes with respect to outlying and lengthening branches, reaching a minimum with respect to the longest outermost branches, whereby to assure compensating progressive acceleration of dough or paste proportional to the increase of flow path length, and thus to further assure full flow of dough or paste in all branches at substantially equalized and therefore uniform pressure.

The discharge end of said second spreader section 23 is suitably coupled to the die housing 11 so that its several spreader passage branches are connected respectively in communication with admission ports 28 leading into the die chamber 12, which ports are disposed at substantially equi-spaced longitudinal intervals throughout the length of said die chamber 12 and the die plate 13.

By the described novel distributive delivery of dough or paste to the interior of the die means, the incoming dough or paste exerts a constant and uniform pressure upon the dough or paste content of the die chamber 12 throughout the entire length thereof, in other words, within the outlying end portions as well as within the intermediate portion thereof. As a consequence of this, constant extruding pressure of the dough or paste will be exerted uniformly over the entire area of the apertured die plate 13, so that the extruded paste strings will be expressed from all die apertures at uniform speed and mass throughout the entire lengths of the rows of die apertures 14.

Supported by the framework 10 beneath the die means is rack rod loading and conveyer mechanism by means of which rows of paste strings, issued from the die means, are automatically looped over drier rack rods, and thereupon delivered to drier apparatus. Mounted on the respective side members 29 of the framework 10, within the lower part of the framework, are laterally spaced and aligned synchronously operated paste string racking conveyers, which are relatively spaced apart so as to permit the rows of paste strings issued from the die means to descend between the rack rod receiving portions thereof. Each racking conveyer comprises a drive sprocket 30 of relatively large diameter, which is affixed on a jack shaft 31 journaled in a supporting bearing 32 which is attached to a side member 29 of the framework 10. Mounted within the upper part of said framework 10, so as to be upwardly and forwardly offset from the drive sprocket 30 with which it is to cooperate, is a relatively small carrier sprocket 33. Said carrier sprocket is freely rotatable on a jack shaft 34 journaled in a supporting bearing 35 which is attached to a side member of the framework 10. Arranged to run over and between the drive sprocket 30 and the carrier sprocket 33 is a conveyer chain 36. The conveyer chain 36 is of such length that its upwardly moving operative course moves through a curved path from the drive shaft 30 to the carrier sprocket 33. Affixed to the conveyer chains 36, at suitably spaced intervals along the same, are rack rod engaging hooks 37.

Supported in connection with the framework 10 is rack rod delivery chute means 38, the discharge end of which inclines downwardly so as to terminate adjacent to the rearward sides of the drive sprockets 30 and the conveyer chains 36 running thereover, whereby to hold the lowermost rack rod R contained in the chute means 38 in the path of movement of approaching conveyer borne rod carrier hooks 37, so that said rack rod may be picked up by the latter so as to extend between the conveyer chains, and so as to be carried on thereby.

The means for driving the paste string rack rod loading and conveyer mechanism comprises a main drive shaft 39 which is journaled in bearings 40 supported by the lower part of the framework 10 to extend transversely between the framework side members 29 below the path of movement of loaded rack rods. Said main drive shaft 39 is driven by an electric motor 41 through sprocket and chain or other suitable transmission mechanism 42. Fixed on said main drive shaft 39 are driving sprockets 43 for operating drive chains 44 which run over driven sprockets 45 fixed on the respective jack shafts 31. Said driving sprockets 43 and driven sprockets 45 are of such relative sizes as to furnish a reduction suitable to obtain a desired speed of movement of the rack rod loading mechanism.

Means are provided for automatically cutting away, at proper times, the rows of paste strings issued from the die means so as to detach the same from the die plate 13, such means comprising an independent cutting mechanism for each row of paste strings issued from the die paste apertures 14, each said cutting mechanism being actuated by its own power driven operating mechanism, but in alternated timed relation one to the other, and in timed relation to the operation of the rack rod loading mechanism, as will be hereinafter more fully described.

Said cutting mechanisms are supported beneath the die housing 11 so that their cutter blades may cooperate with the exterior face of the apertured die plate 13. Suspended by hangers 46 below and transverse to each end of the die housing 11 are guide or track rods 47. One cutting mechanism, e. g. the forward cutting mechanism A, comprises longitudinally opposed slide blocks 48 respectively movable on the forward portions of the guide or track rods 47. Pivotally connected with each slide block 48 is an oscillatable bracket block 49. A forward cutter blade 50 is affixed by its ends to and between said bracket blocks 49 to extend longitudinally along the forward portion of the die plate 13. Said bracket blocks 49 are spring urged to uptilted positions whereby to engage the cutting edge of the cutter blade 50 with the under face of the die plate 13. Pivotally supported by fulcruming means 51 mounted on an adjacent side member 29 at each side of the framework are cutter blade operating levers 52, which are pivotally connected at their upper ends with the respective slide blocks 48. The other cutting mechanism, e. g. the rearward cutting mechanism B, similarly comprises longitudinally opposed slide blocks 48' respectively movable on the rearward portions of the guide or track rods 47. Pivotally connected with each slide block 48' is an oscillatable bracket block 49'. A rearward cutter blade 50' is affixed by its ends to and between said bracket blocks 49' to extend longitudinally along the rearward portion of the die plate 13. Said bracket blocks 49' are spring urged to uptilted positions whereby to engage the cutting edge of the cutter blade 50' with the under face of the die plate 13. Pivotally supported by fulcruming means 51' mounted on an adjacent side member 29 at each side of the framework are cutter blade operating levers 52', which are pivotally connected at their upper ends with the respective slide blocks 48'.

A compression spring 53 is mounted on each guide or track rod 47 between the slide blocks 48 and 48', whereby to yieldably retract said slide blocks, cutter blades and operating levers to normal initial positions after actuation of the cutter blades to effect cutting strokes thereof.

The means for actuating the forward cutting mechanism A comprises jack shafts 54 respectively journaled in bearings supported by the respective side members 29 of the framework. Fixed on each jack shaft 54, for cooperation with the lower end portion of an adjacent cutter blade operating lever 52, is an actuating cam 55. Each cam 55 is provided with a crank pin 56 set eccentric to the axis of rotation of the cam. Each oscillatable bracket block 49 is provided with a projecting arm 57 to which is pivotally connected a link 58. The lower ends of the links 58 are provided with slots 59 in which the crank pins 56 engage. The means for operating the jack shafts 54 and their cams 55 comprises a driven shaft 60 which is journaled in and between the side members 29 at the back of the framework. Said jack shafts 54 are each driven from the shaft 60 by sprocket and gear or other suitable transmission means 61. Said shaft 60 is independently driven by an electric motor 62 through sprocket and gear or other suitable transmission means 63.

The means for actuating the rearward cutting mechanism B similarly comprises jack shafts 54' respectively journaled in bearings supported by the respective side members 29 of the framework. Fixed on each jack shaft 54', for cooperation with the lower end portion of an adjacent cutter blade operating lever 52', is an actuating cam 55'. Each cam 55' is provided with a crank pin 56' set eccentric to the axis of rotation of the cam. Each oscillatable bracket block 49' is provided with a projecting arm 57' to which is pivotally connected a link 58'. The lower ends of the links 58' are provided with slots 59' in which the crank pins 56' engage. The means for actuating the jack shafts 54' and their cams 55' comprises a driven shaft 64 which is journaled in and between the side members 29 at the back of the framework and spaced from and parallel to the driven shaft 60. Said jack shafts 54' are each driven from the shaft 64 by sprocket and gear or other suitable transmission means 65. Said shaft 64 is independently driven by an electric motor 66 through sprocket and gear or other suitable transmission means 67.

Each of the cutting mechanisms A and B, when actuated, operate alike, so that description of the operation of one, as e. g. the cutting mechanism B, will apply equally to the other. In operation therefore the cutting mechanism B functions as follows:

When the cams 55' occupy normal initial positions, the bracket blocks 49' occupy uptilted but retracted positions, whereby the cutter blade 50' is operatively positioned preparatory to a cutting stroke. The uptilted bracket blocks 49' draw upward the links 58', so that the slots 59' of the latter are positioned to embrace by their lower ends the cooperating crank pins 56'. When the motor 66 is started, its power is transmitted to the cams 55', so that the same are rotated to engage the blade operating levers 52' so as to rock the same in direction to advance the cutter blade 50' along the underface of the die plate 13, and across the adjacent row of apertures 14, whereby to sever the paste strings that have issued from the latter (see Fig. 5). During the cutting stroke of the cutter blade 50', the crank pins 56' will ride upwardly and then downwardly in the slots 59' of the links 58', and consequently will impart no movement to said links. After the cutter blade 50' completes its cutting stroke, the rotating cams 55' will start to withdraw from the operating levers 52', thus permitting the springs 53 to thrust back the slide blocks 48' and thus impart retractive movement to the cutter blade 50'. At this time, the crank pins 56' will have descended the slots 59' so as to abut the lower ends thereof, whereupon the continuing rotation of the cams 55' and accompanying downward movement of the crank pins 56' will draw down the links 58' with down swinging effect upon the bracket blocks 49', whereby to down swing and hold down swung the cutter blade 50' away from the underface of the die plate 13 (see Fig. 6), while said blade moves back to and until it resumes normal initial retracted position, and thus completes the cycle of operation of said cutting mechanism B.

The rack rod loading mechanism is intermittently operated in timed relation to emission of paste strings from the die means. The dough or paste is continuously emitted from the rows of die plate apertures 14. In the operation of the rack rod loading mechanism, the paste string loading conveyer 36 is brought to rest in position behind the forming forward row of paste strings, which due to the timed alternated operation of the cutting mechanisms A and B is completed in advance of the completion of the rearward row of paste strings. At the proper time, the looping conveyer 36 is started, whereby the rack rod R positioned thereby will be moved forward against said forward row of paste strings. The rack rod R contacts the paste strings at approximate mid points of the lengths thereof, and as the rod is moved outwardly and upwardly, the strings will be looped thereon. After the rod has been advanced and raised to a predetermined point, the cutting mechanism, operative upon the forward row of paste strings, will be actuated, so as to cut away the latter from the die plate, thus permitting the trailing end portions to drop, thus completing the looping of the strings over the rod so as to load the same thereon. The continuing advance of the conveyer 36 thereupon carries the loaded rod to the discharge and transfer conveyer means hereinafter described, by means of which the loaded rod is delivered to and for movement through drier apparatus. In the meantime, emission of the rearward row of paste strings to proper length is completed, and a second rack rod R, which has been picked up by the conveyer 36, is engaged with said rearward row of paste strings and advanced therewith so as to loop said strings thereover, whereupon at the proper time, the cutting mechanism operative upon said second row of paste strings will be actuated, so as to cut away the trailing end portions thereof from the die plate. The conveyer 36 is continued in operation to bring a succeeding rack rod R into position, whereupon the conveyer is stopped until emission of a succeeding forward row of paste strings is completed, whereafter repetition of the above described cycle of rack rod loading operations occurs.

The above described rack rod loading and related paste string cut off operations are coordinately timed and controlled by electro-mechanical control means, the character of which is schematically illustrated in Fig. 7 of the drawings, and which comprises, in connection with associated agencies, a timer 100, a starting or control box 101, a starting or control box 102, and a starting or control box 103. Said starting or control boxes are connected in a power circuit 104—105. The motor 41 which drives the rack rod loading mechanism is started, at predetermined time intervals, by the timer 100 acting through the starting or control box 101, thereby rotating the drive sprockets 30 of the conveyer 36. As said sprockets 30 revolve, a trip pin 106, mounted on one thereof, is moved thereby to engage and close a switch 107 at the proper time, whereby to energize the motor 62 through the starting or control box 102, thus initiating operation of the paste string cutting mechanism A, whereby its cutter blade 50 is caused to effect a cutting stroke cycle. Upon completion of the cutting stroke cycle of cutting mechanism A, a trip pin 108, which revolves with the cam 55, engages and momentarily opens a switch 109, which operates, through said starting or control box 102, to stop the motor 62. As this conveyer sprocket 30 continues to revolve, and as the cycle of operation of cutting mechanism A is completed, said trip pin 106 is advanced to engage and close a switch 110 at the proper time, whereby to energize the motor 66 through the starting or control box 103, thus initiating operation of the paste string cutting mechanism B, whereby its cutter blade 50' is caused to effect a cutting stroke cycle. Upon completion of such cutting stroke cycle, a trip pin 111, which revolves with the cam 55', engages and momentarily opens a switch 112, which operates, through the starting or control box 103, to stop the motor 66. As the conveyer sprocket 30 completes its revolution, another trip pin 113 carried thereby engages and momentarily opens a switch 114, which operates, through the starting or control box 101, to stop the motor 41 which drives the rack loading mechanism, thus completing a cycle of operation of the latter. The timer 100 functions thereafter to repeat said cycles of operation of the rack rod loading mechanism at predetermined intervals, according to the adjusted setting of said timer device.

Extending from the discharge end of said rack rod loading conveyer 36 is an outgoing discharge conveyer means 68, preferably of the sprocket and chain type, upon which the loaded rack rods R are deposited by the conveyer 36. Said discharge conveyer means is driven by the jack shafts 34, and said jack shafts are in turn driven by chain and sprocket or other suitable transmission means 69 from the jack shafts 31 which drive the sprockets 30 of the conveyer 36. Said transmission means 69 is so designed that the linear speed of said discharge conveyer means 68 somewhat exceeds that of the loading conveyer 36. Said discharge conveyer means leads to a transfer conveyer means 70 by which the loaded rack rods R are automatically carried from said discharge conveyer means 68, to drier apparatus 71, to be automatically moved through the latter and finally discharged therefrom, ready for packaging of the product for distribution; all whereby the operations from mixing of the dough or paste in the mixer 15 to discharge of the finished product at the outlet of the drier apparatus is entirely automatic, without necessity for intermediate handling of the material at any point.

The apparatus, as above described, is primarily adapted to automatically and continuously produce long paste products; means may be included, however, for optionally producing short paste products as well. To the latter end, a short paste extrusion head die means 80 may be interposed between the discharge head 16 of the mixer apparatus 15 and the paste delivery and spreading means leading to the long paste extrusion die housing 11 (see Fig. 1). In such case, a rotary cutting means 81 is provided for cooperation with the short paste extrusion die means 80, the same being driven by suitable transmission means 82 operated from the same power by which the mixer apparatus is operated. To permit selective use of said short and long paste producing means, means (not shown) for optionally plugging either the one or the other against flow of dough or paste thereto from the mixer apparatus may be provided.

Various changes can be made in the above described apparatus for automatically and continuously producing alimentary paste products without departing from the scope of the invention as defined in the following claims. It is therefore intended that all matter described in the foregoing specification and shown in the accompanying drawings shall be interpreted as illustrative and not in a limiting sense.

I claim:

1. In a continuous alimentary paste production apparatus, a horizontally disposed die means providing an elongated die chamber, an elongated die plate at the bottom of said chamber, said die plate having extrusion orifices adapted to emit paste strings in linearly spaced relation ready to be operated upon by cooperative rack rod loading and string cut of mechanisms, means to continuously feed plastic paste to said die chamber under pressure, and means intermediate said paste feeding means and die chamber for delivering the paste to the latter through progressively multiplying divergent passages having their discharge ends connected in communication with said die chamber at a multiplicity of spaced points along the length thereof, at least the discharge branches of said passages being of relatively and progressively increased cross-sectional area from the innermost of smallest cross-section, which communicate with the mid portion of said die chamber, to the outermost of largest cross-section, which communicate with the respective end portions of said die chamber, said divergent passages being of relatively increasing length as they diverge from the paste feeding means toward the respective outer end portions of the die chamber, all whereby to keep said chamber filled with paste under substantially uniform extruding pressure throughout the length thereof.

2. In a continuous alimentary paste production apparatus, a horizontally disposed die means providing an elongated die chamber, an elongated die plate at the bottom of said chamber, said die plate having extrusion orifices adapted to emit paste strings in linearly spaced relation ready to be operated upon by cooperative rack rod loading and string cut off mechanisms, means to continuously issue a stream of plastic paste under pressure, and means for dividing the paste stream for delivery into the die chamber at a multiplicity of points along the length thereof, said latter means including a feeder means having paste stream dividing passages and spreader means having divergent passages branches leading from each feeder means passage and additional divergent passage branches leading from said first mentioned passage branches, at least said second mentioned divergent passage branches being of relatively and progressively increased cross-sectional area from the innermost of smallest cross-section, which communicate with the mid portion of said die chamber, to the outermost of largest cross-section, which communicate with the respective end portions of said die chamber, at least said divergent passage branches of the spreader means being of relatively increasing length as they diverge from the feeder means toward the respective outer end portions of the die chamber, all whereby to keep said chamber filled with paste under substantially uniform extruding pressure throughout the length thereof.

3. In a continuous alimentary paste production apparatus, a horizontally disposed die means providing an elongated die chamber, an elongated die plate at the bottom of said chamber, said die plate having extrusion orifices adapted to emit paste strings in linearly spaced relation ready to be operated upon by cooperative rack rod loading and string cut off mechanisms. means to continuously issue a stream of plastic paste under pressure, and means for dividing the paste stream for delivery into the die chamber at a multiplicity of points along the length thereof, said latter means including a feeder means having paste stream dividing passages, a first spreader section having divergent passage branches leading from each feeder means passage, a second spreader section having divergent passage branches leading from each first spreader passage branch, the inner passage branches of said first spreader section being of smaller cross-sectional area and less length than the outer passage branches thereof, and said passage branches of said second spreader section being of relatively and progressively increased cross-sectional area from the innermost of smallest cross-section, which communicate with the mid portion of said die chamber, to the outermost of largest cross-section, which communicate with the respective end portions of said die chamber, said passage branches of said second spreader section being of relatively increasing length as they diverge from the passage branches of said first spreader section toward the respective outer end portions of the die chamber, all whereby to keep said chamber filled with paste under substantially uniform extruding pressure throughout the length thereof.

CONRAD AMBRETTE.

REFERENCES CITED

The following references are of record in the file of this patent:

UNITED STATES PATENTS

| Number | Name | Date |
|---|---|---|
| 567,392 | Hough | Sept. 8, 1896 |
| 598,404 | Weichert | Feb. 1, 1898 |
| 1,328,025 | Wheeler | Jan. 13, 1920 |
| 1,409.259 | Sykora | Mar. 14, 1922 |
| 2,003,617 | Toews | June 4, 1935 |
| 2,100,821 | Sim | Nov. 30, 1937 |
| 2,103,317 | Cavagnaro | Dec. 28, 1937 |
| 2,223,351 | De Francisci | Dec. 3, 1940 |
| 2,223,352 | De Francisci | Dec. 3, 1940 |
| 2,308,552 | Spinozzi | Jan. 19, 1943 |
| 2,437,460 | De Francisci | Mar. 9, 1948 |